(12) United States Patent
Seo

(10) Patent No.: US 9,751,376 B2
(45) Date of Patent: Sep. 5, 2017

(54) BUSHING HAVING ROTATABLE INNER ELEMENTS AND STABILIZER BAR ASSEMBLY HAVING THE SAME

(71) Applicant: Hyundai Motor Company, Seoul (KR)

(72) Inventor: Jae-Hwan Seo, Gwangju (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/337,105

(22) Filed: Oct. 28, 2016

(65) Prior Publication Data

US 2017/0203630 A1 Jul. 20, 2017

(30) Foreign Application Priority Data

Jan. 19, 2016 (KR) ........................ 10-2016-0006649

(51) Int. Cl.
*B60G 21/055* (2006.01)
(52) U.S. Cl.
CPC ....... *B60G 21/055* (2013.01); *B60G 21/0551* (2013.01); *B60G 2204/41* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,520,465 A | * | 5/1996 | Kammel | B60G 21/0551 267/293 |
| 5,702,121 A | * | 12/1997 | Song | B60G 21/0551 280/124.1 |
| 8,505,940 B1 | * | 8/2013 | Hufnagle | B60G 21/0551 280/124.13 |
| 2004/0090033 A1 | * | 5/2004 | Cai | B60G 21/0551 280/124.107 |
| 2004/0155427 A1 | * | 8/2004 | Nakajima | B60G 21/0551 280/124.166 |
| 2006/0091595 A1 | * | 5/2006 | Hayashi | B60G 21/0551 267/276 |
| 2006/0243355 A1 | * | 11/2006 | Haiderer | B60G 21/055 148/593 |

(Continued)

FOREIGN PATENT DOCUMENTS

| | | | | |
|---|---|---|---|---|
| DE | 102004056884 A1 | * | 6/2006 | ......... B60G 21/0551 |
| DE | 102012020628 A1 | * | 4/2014 | ............ B60G 7/001 |

(Continued)

*Primary Examiner* — Nicole Verley
(74) *Attorney, Agent, or Firm* — Morgan Lewis & Bockius LLP

(57) ABSTRACT

A bushing having rotatable inner elements which includes a plurality of housings and a plurality of rubbers and into which a stabilizer bar is inserted to be mounted on a vehicle body, may include an outer housing connected to a lower end of a rod connected to the vehicle body, an outer rubber attached on the inner surface of the outer housing, a first inner housing disposed in the outer rubber, a second inner housing disposed in the first inner housing to be rotated with respect to the first inner housing, an inner rubber disposed in the second inner housing, and being in contact with a surface of the stabilizer bar, and a retainer ring formed in a partially-cut ring shape such that the diameter thereof is increased, disposed between the first and second inner housings, and pressurizing the second inner housing toward the inner rubber.

10 Claims, 10 Drawing Sheets

(56) References Cited

U.S. PATENT DOCUMENTS

| | | | |
|---|---|---|---|
| 2008/0036166 A1* | 2/2008 | Russell | B60G 21/0551 |
| | | | 280/124.107 |
| 2008/0106056 A1* | 5/2008 | Kleckner | B60G 21/0551 |
| | | | 280/124.107 |
| 2013/0028543 A1* | 1/2013 | Kang | B60G 21/0551 |
| | | | 384/13 |
| 2013/0028547 A1* | 1/2013 | Jang | B60G 21/0551 |
| | | | 384/215 |
| 2014/0131969 A1* | 5/2014 | Rowe | B60G 21/055 |
| | | | 280/124.106 |
| 2015/0028531 A1* | 1/2015 | Grundmeier | B60G 21/0551 |
| | | | 267/141.2 |
| 2016/0369860 A1* | 12/2016 | Trotter | B60G 7/001 |

FOREIGN PATENT DOCUMENTS

| | | | | |
|---|---|---|---|---|
| DE | 202016100149 U1 * | 2/2016 | | B60G 21/0551 |
| DE | 102014217839 A1 * | 3/2016 | | F16F 1/38 |
| FR | WO 2013178896 A1 * | 12/2013 | | B60G 11/60 |
| JP | 63-057310 A | 3/1988 | | |
| JP | H11-192828 A | 7/1999 | | |
| JP | 4142724 B1 * | 9/2008 | | B60G 21/0551 |
| JP | 2009-83575 A | 4/2009 | | |
| JP | 2009-126325 A | 6/2009 | | |
| KR | 10-1999-0019861 A | 3/1999 | | |
| KR | 10-2005-0092894 A | 9/2005 | | |
| KR | 10-2009-0062850 A | 6/2009 | | |
| KR | 10-2012-0065030 A | 6/2012 | | |
| KR | 10-2013-0062138 A | 6/2013 | | |
| KR | 10-1470799 B1 | 12/2014 | | |
| TR | WO 2015088459 A1 * | 6/2015 | | B60G 21/0551 |

* cited by examiner

11

BUSHING HAVING ROTATABLE INNER ELEMENTS AND STABILIZER BAR ASSEMBLY HAVING THE SAME

CROSS-REFERENCE TO RELATED APPLICATIONS

The present application claims priority to Korean Patent Application No. 10-2016-0006649, filed Jan. 19, 2016, the entire contents of which is incorporated herein for all purposes by this reference.

BACKGROUND OF THE INVENTION

Field of the Invention

Various embodiments of the present invention relate to a bushing for installing a stabilizer bar assembly for suppressing a roll of a vehicle, and a stabilizer bar assembly having the same, and more particularly, to a bushing having rotatable inner elements, which is capable of relatively rotating elements forming the bushing in a stabilizer bar assembly such that the angle of the stabilizer bar can be adjusted according to the specification in the modularized stabilizer bar assembly, and a stabilizer bar assembly having the same.

Description of Related Art

A suspension system of a vehicle includes a stabilizer bar for suppressing a roll of the vehicle.

As illustrated in FIG. 1, the stabilizer bar may be assembled in the form of a stabilizer bar assembly 10 in which the stabilizer bar 11, a rod 12, a bushing 120 and a bracket 13 are modularized, and the stabilizer bar assembly 10 is supplied to a line, in order to improve the productivity and convenience of the assembling process.

In order to reduce noise and to increase roll stiffness, the use of a bushing with a double housing structure has recently increased.

The modularized stabilizer bar assembly 10 contributes to increasing productivity. However, the double housing-type bushing 120, which is installed at the connection between the stabilizer bar 11 and the rod 12 and includes a plurality of housings and a plurality of rubbers, makes it difficult to adjust the angle between the rod 12 and the stabilizer bar 11.

As illustrated in FIG. 3, the bushing 120 has a structure in which an outer housing 121, an outer rubber 122 formed of a buffer material, an inner housing 123, and an inner rubber 125 formed of a buffer material are sequentially arranged from outside. However, when the stabilizer bar 11 is inserted into the bushing 120, an element forming the bushing 120, for example, the inner housing 123 cannot be rotated.

Thus, although the same parts are used to manufacture the stabilizer bar assembly 10, the stabilizer bar assembly 10 must be manufactured in various types when the angle at which the stabilizer bar assembly 10 is assembled is changed or the model or specification of the vehicle is changed.

Furthermore, the angle to which the stabilizer bar assembly 10 is set is not optimized for operation of the vehicle, and set to an angle at which the stabilizer bar assembly 10 can be easily assembled. Thus, since the angle is different from the angle optimized for operation, the bushing 120 is inevitably deformed until the stabilizer bar assembly 10 is set to the angle optimized for operation of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bushing having rotatable inner elements, which is capable of rotating a stabilizer bar at a desired angle and setting the stabilizer bar in a state optimized for operation of a vehicle, and a stabilizer bar assembly having the same.

Additionally, various aspects of the present invention are directed to providing a bushing having rotatable inner elements, through which stabilizer bar assemblies manufactured of the same parts can be commonly applied to various types of vehicles or specifications, and a stabilizer bar assembly having the same.

According to various aspects of the present invention, a bushing having rotatable inner elements which includes a plurality of housings and a plurality of rubbers and into which a stabilizer bar is inserted to be mounted on a vehicle body, may include an outer housing connected to a lower end of a rod configured to be connected to the vehicle body, an outer rubber formed of a buffer material and attached on the inner surface of the outer housing, a first inner housing disposed in the outer rubber, a second inner housing disposed in the first inner housing to be rotated with respect to the first inner housing, an inner rubber formed of a buffer material, disposed in the second inner housing, and being in contact with a surface of the stabilizer bar, and a retainer ring formed in a partially-cut ring shape such that the diameter thereof is increased, disposed between the first and second inner housings, and pressurizing the second inner housing toward the inner rubber.

The second inner housing may include a flange portion formed at an end thereof, and the flange portion may be extended in a radial direction of the second inner housing from the end of the second inner housing, and the retainer ring may be disposed between the flange portion and the end of the first inner housing.

When the retainer ring is spread and separated from the second inner housing, the first and second inner housings may be relatively rotated with respect to each other.

The bushing may further include a rotation stopper formed between the first and second inner housings to stop relative rotation between the first and second inner housings.

The rotation stopper may include a coupling groove formed in at least one of the first and second inner housings, and a coupling protrusion formed on a remaining one of the first and second inner housings.

The coupling groove may be formed in the first inner housing, and the coupling protrusion may be formed on the second inner housing.

The coupling protrusion may be formed with a predetermined length from an end of the second inner housing to an inside of the second inner housing.

A plurality of coupling grooves may be formed at intervals along a circumference of at least one of the first and second inner housings.

The coupling grooves may be formed at even intervals.

According to various aspects of the present invention, a stabilizer bar assembly which comprises a bushing having rotatable inner elements, may include a pair of rods for coupling to a vehicle body through a bracket, with an interval provided therebetween, the bushing having rotatable inner elements including an outer housing connected to lower ends of rods configured to be connected to the vehicle body, an outer rubber formed of a buffer material and attached on the inner surface of the outer housing, a first inner housing disposed in the outer rubber, a second inner housing disposed in the first inner housing to be rotated with respect to the first inner housing, an inner rubber formed of a buffer material, disposed in the second inner housing, and being in contact with a surface of the stabilizer bar, and a retainer ring formed in a partially-cut ring shape such that the diameter thereof is increased, disposed between the first and second inner housings, and pressurizing the second inner housing toward the inner rubber, in which the bushing may be coupled to each of lower ends of the rods, and a stabilizer bar formed in a widthwise direction of the vehicle body, having end portions which may be bent in a longitudinal direction of the vehicle body such that both ends thereof may be connected to the vehicle body, and inserted and fixed to the bushing. It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
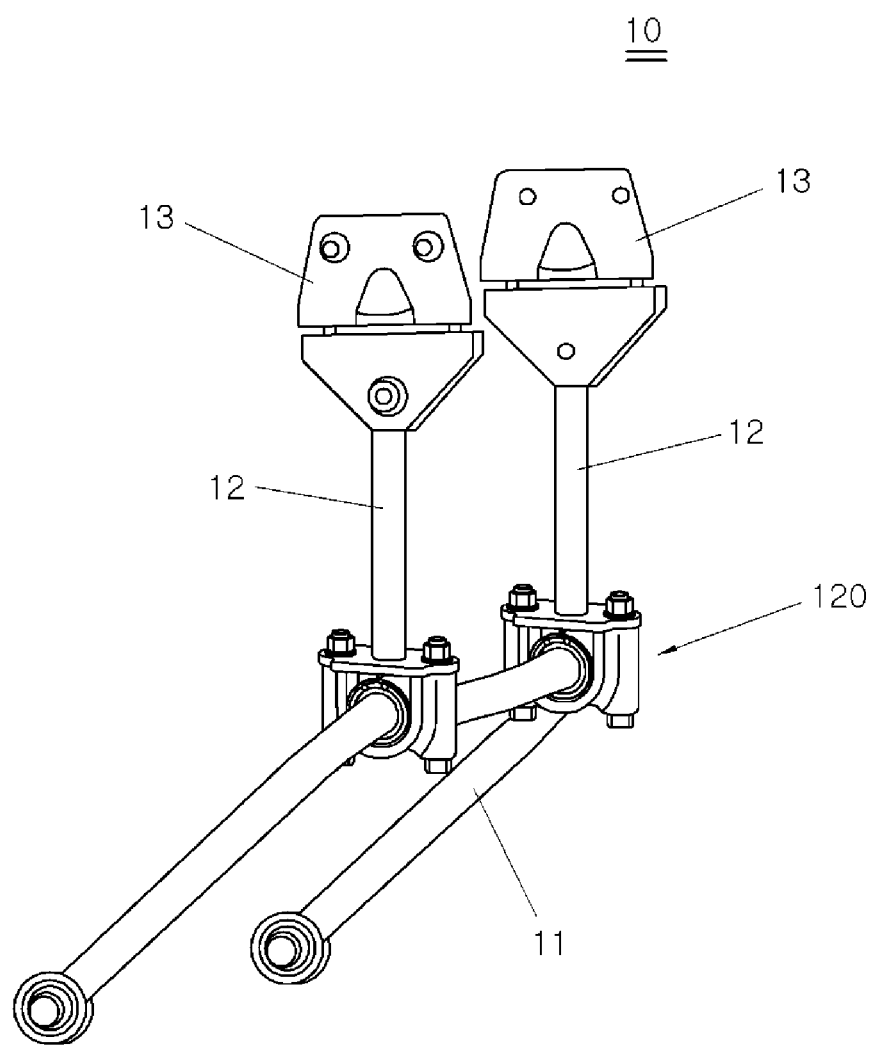
FIG. 1 is a perspective view of a stabilizer bar assembly having a conventional bushing.
Figure 2:
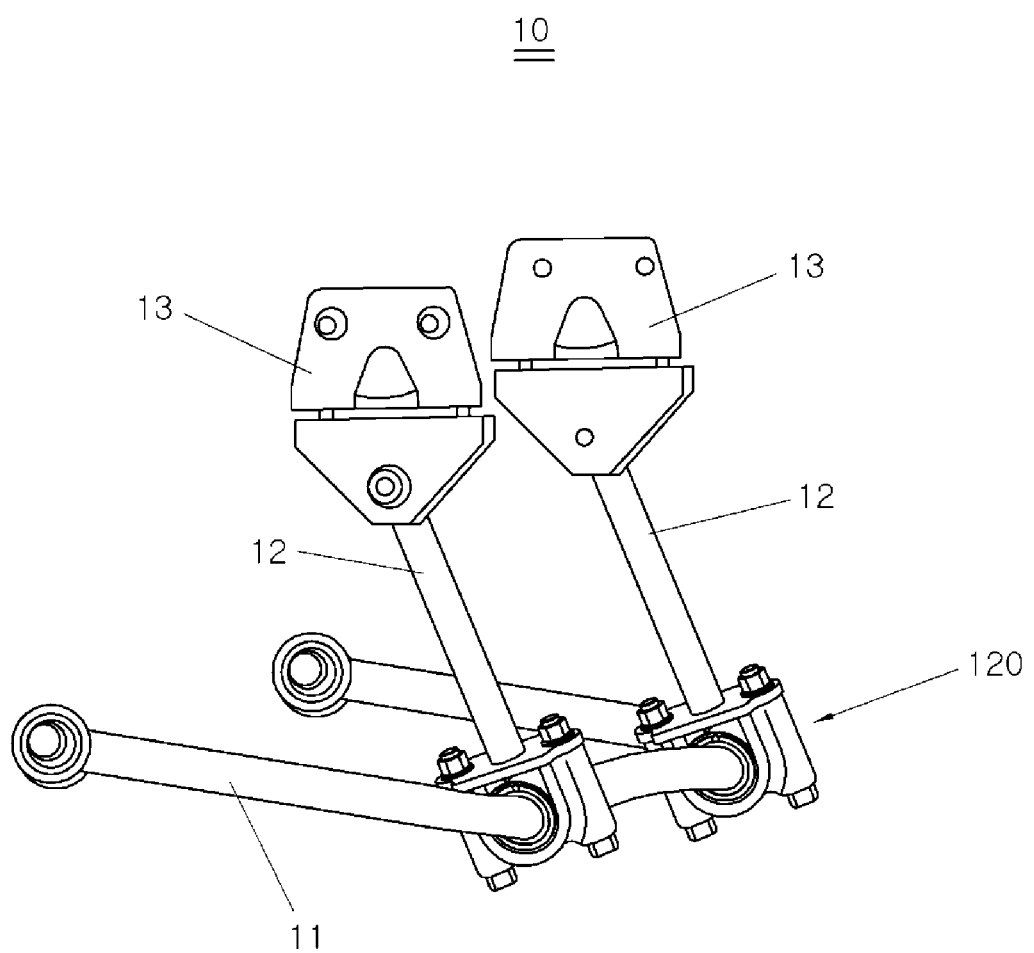
FIG. 2 is a perspective view of the conventional bushing.
Figure 3:
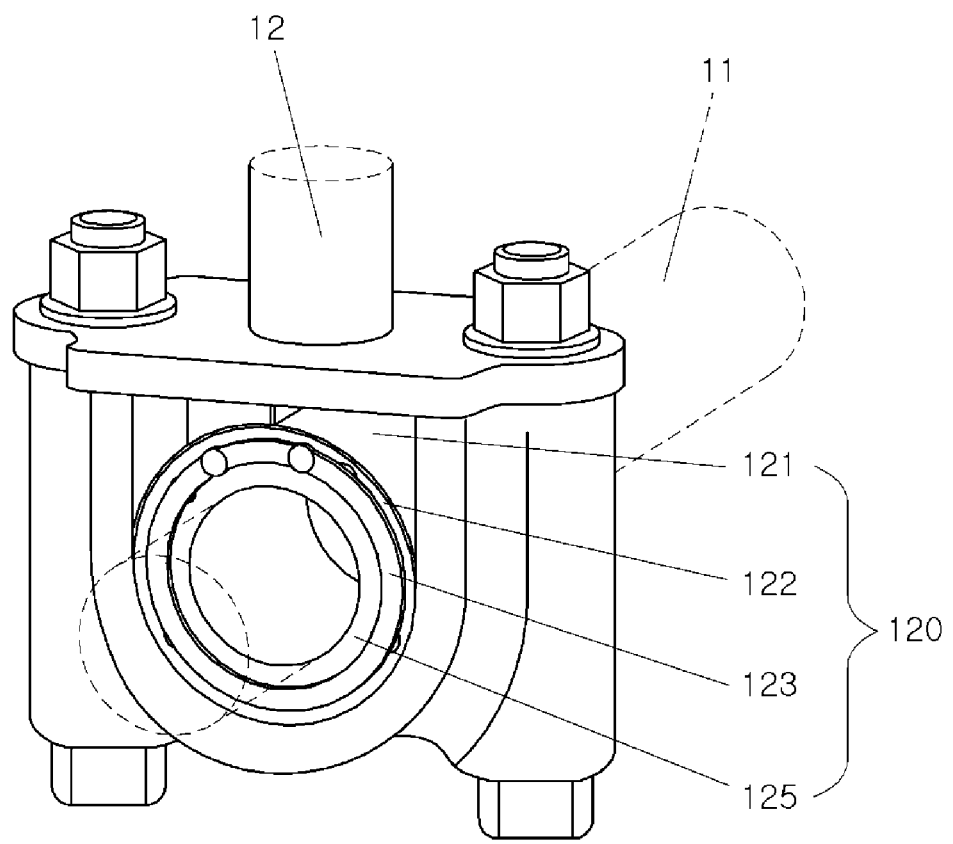
FIG. 3 is a perspective view illustrating a state in which the angle of a stabilizer bar is changed in the stabilizer bar assembly having the conventional bushing.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to various embodiments of the present invention, in a stabilizer bar assembly including a bushing having rotatable inner elements, a bushing 20 having rotatable inner elements may be applied to a stabilizer bar assembly 10 to adjust the angle of a stabilizer bar 11. The stabilizer bar assembly 10 may include a pair of rods 12, the bushing 20, and the stabilizer bar 11. The pair of rods 12 may be connected to the vehicle body through a bracket 13, with a distance set therebetween. The bushing 20 may be coupled to each of the lower ends of the pair of rods 12. The stabilizer bar 11 may be formed in the widthwise direction of the vehicle, have end portions which are bent in the longitudinal direction of the vehicle such that both ends thereof are connected to the vehicle body, and be inserted and fixed to the bushing 20. When the inner elements of the bushing 20 are rotated to adjust the angle, the angle of the stabilizer bar 11 in the stabilizer bar assembly 10 can be adjusted.

Figure 4:
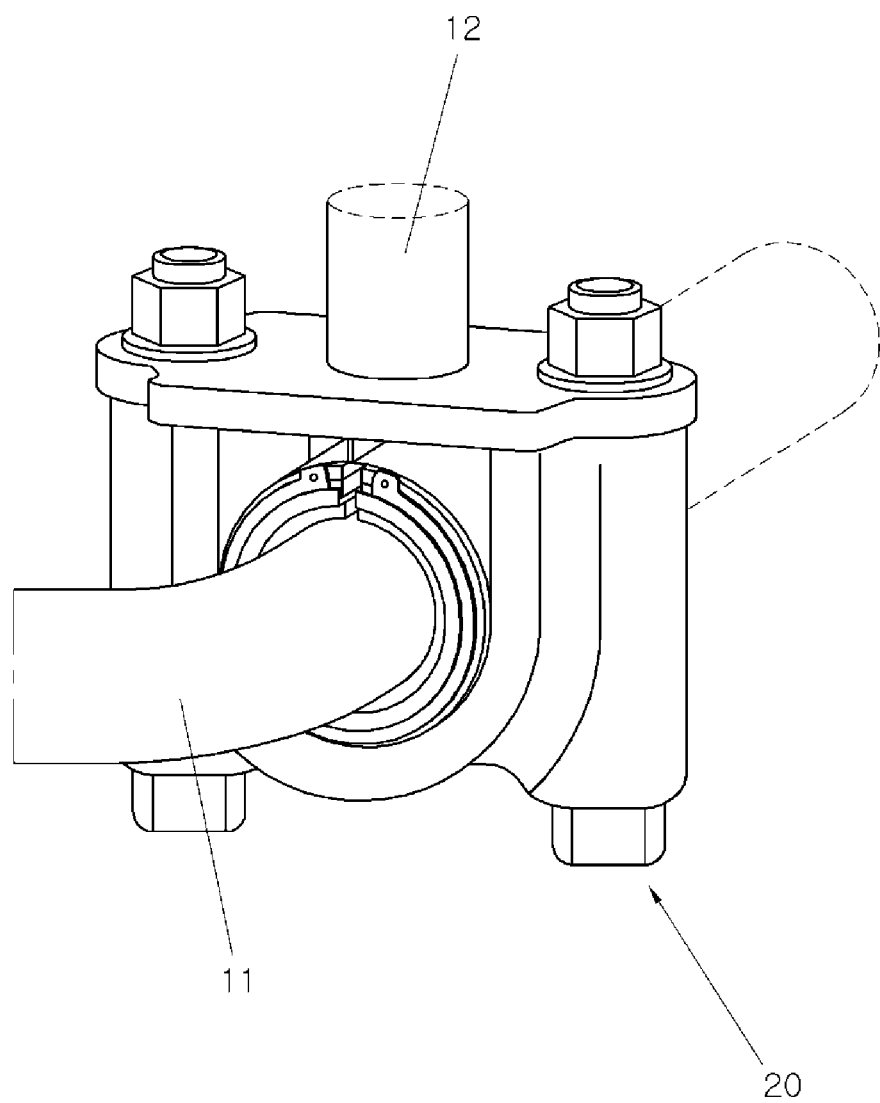
FIG. 4 is a perspective view illustrating a bushing having rotatable inner elements and a stabilizer bar assembly having the same in accordance various embodiments of the present invention.
Figure 5:
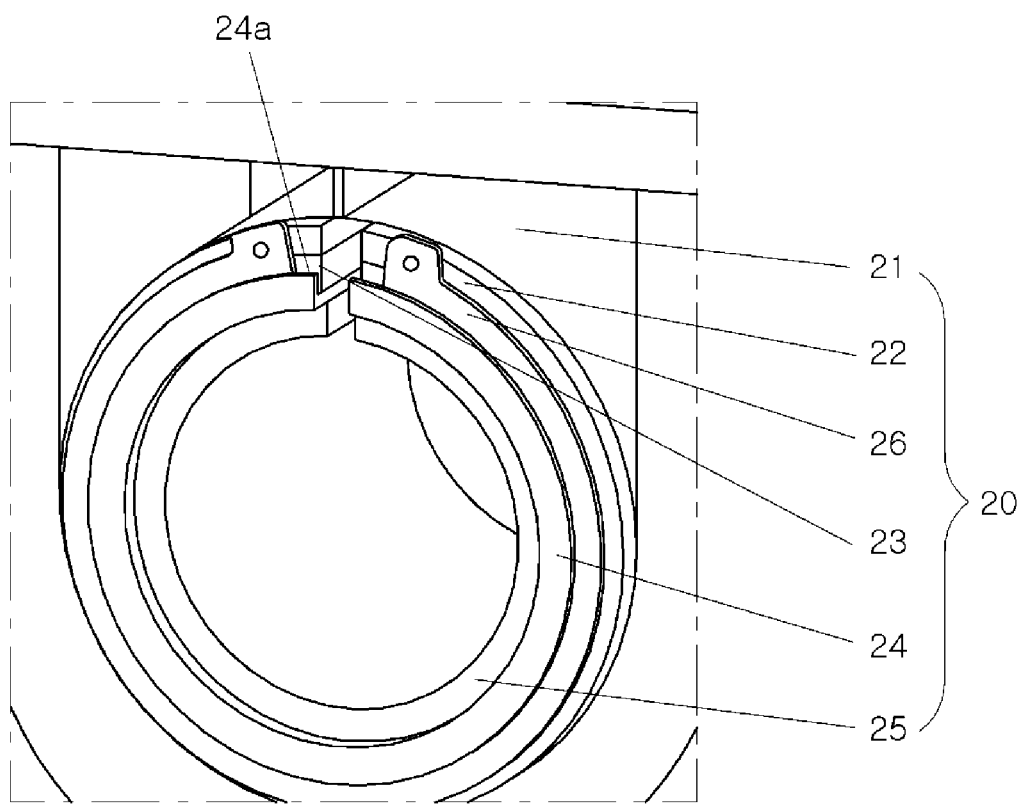
FIG. 5 is a perspective view of the bushing having rotatable inner elements in accordance with various embodiments of the present invention.

As illustrated in FIGS. 4 and 5, the bushing including rotatable inner elements in accordance with various embodiments of the present invention may include an outer housing 21, an outer rubber 22, a first inner housing 23, a second inner housing 24, an inner rubber 25 and a retainer ring 26. The outer housing 21 may be connected to the lower end of the rod 12 which is connected to the vehicle body. The outer rubber 22 may be formed of a buffer material, and attached to the inner surface of the outer housing 21. The first inner housing 23 may be installed in the outer rubber 22. The second inner housing 24 may be installed in the first inner housing 23 so as to be rotated with respect to the first inner housing 23. The inner rubber 25 may be formed of a buffer material, installed in the second inner housing 24, and placed against the surface of the stabilizer bar 11. The retainer ring 26 may be formed in a ring shape of which a part is cut. Thus, the diameter of the retainer ring 26 can be increased. Furthermore, the retainer ring 26 may be installed between the first and second housings 23 and 24, and pressurize the second inner housing 24 toward the inner rubber 25.

The outer housing 21 may be fastened to the lower end of the rod 12 of the stabilizer bar assembly 10, and arranged at the outermost part of the bushing 20. The outer housing 21 may have a hollow portion formed therein, such that other elements can be installed and the stabilizer bar 11 can be passed through the outer housing 21.

The outer rubber 22 may be installed on the inner surface of the outer housing 21. The outer rubber 22 may be formed in a ring shape. Furthermore, the outer rubber 22 may be formed of a buffer material such as rubber, and absorb an impact applied from outside.

The inner housings 23 and 24 may be installed in the outer rubber 22, and include the first and second inner housings 23 and 24. The first and second inner housings 23 and 24 may be relatively rotated with respect to each other, in order to adjust the angle of the stabilizer bar 11 installed in the bushing 20. The inner housing which is in contact with the inner surface of the outer rubber 22 may be set to the first inner housing 23, and the inner housing which is in contact with the inner surface of the first inner housing 23 may be set to the second inner housing 24. Both of the first and second inner housings 23 and 24 may be formed of a metallic material, and have a cylindrical shape. Furthermore, both of the first and second inner housings 23 and 24 may be formed in a shape of which a part is cut in the axial direction, such that the diameters of the first and second inner housings 23 and 24 can be varied.

The second inner housing 24 may have a flange portion 24a formed at the end thereof, the flange portion 24a being extended in the radial direction of the second inner housing 24. The flange portion 24a may be arranged at a distance from the end of the first inner housing 23.

The first and second inner housings 23 and 24 may be relatively rotated with respect to each other. However, when the first and second inner housings 23 and 24 are relatively rotated with respect to each other in a state where the bushing 20 is mounted, the initial assembled state may be distorted. In order to prevent the distortion, a rotation stopper may be provided.

Figure 6A:
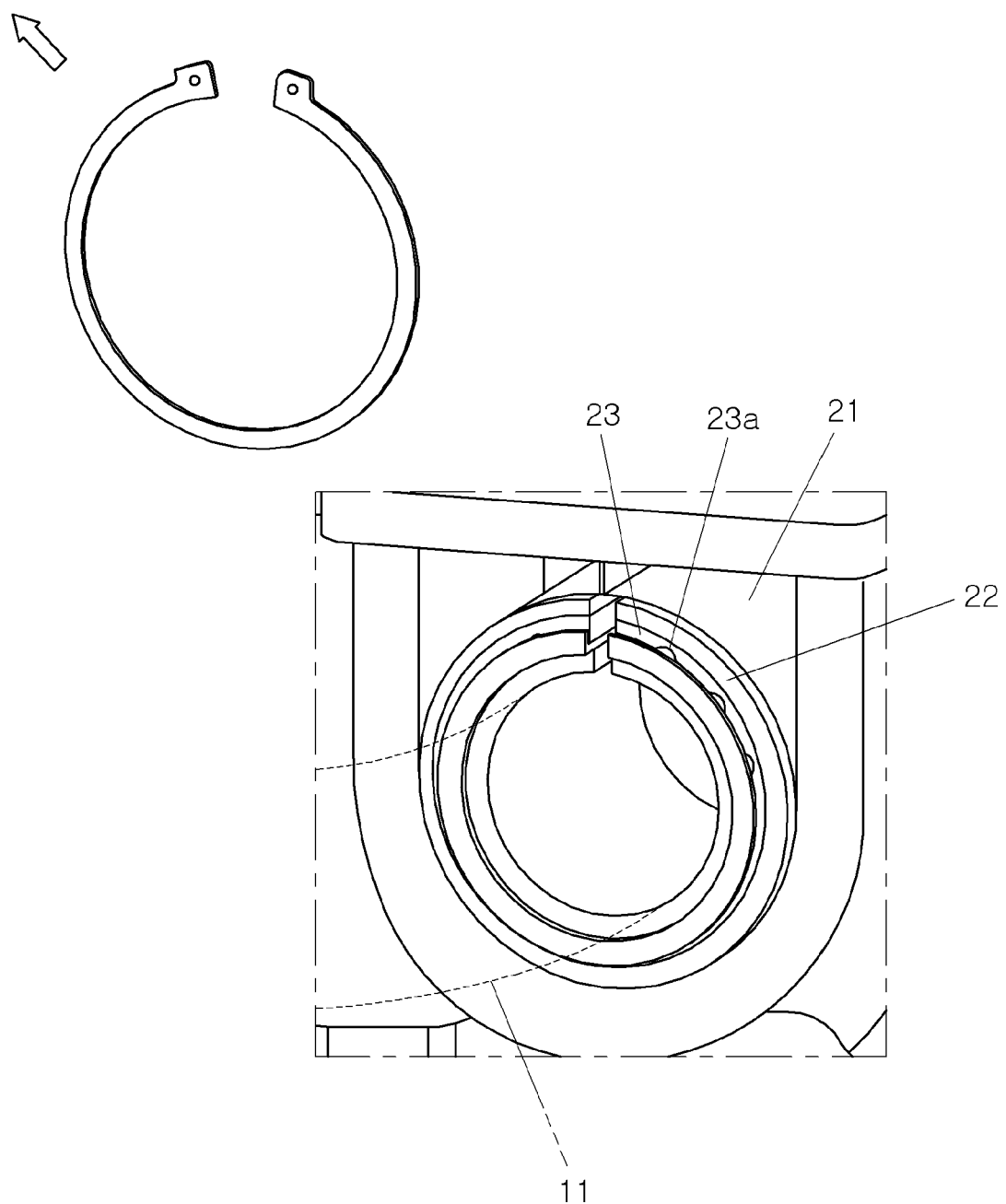
FIG. 6A, FIG. 6B, FIG. 6C, FIG. 6D, and FIG. 6E are perspective views illustrating a process of adjusting the angle of the stabilizer bar using the bushing having rotatable inner elements and the stabilizer bar assembly having the same in accordance with various embodiments of the present invention.
Figure 6B:
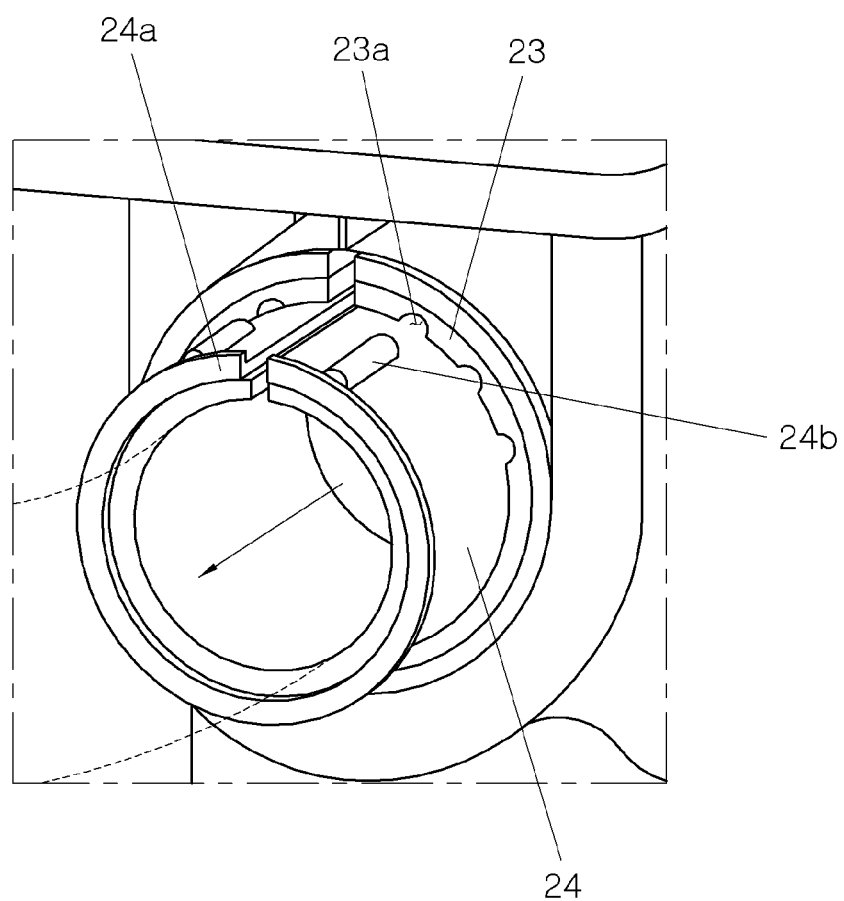

As illustrated in FIG. 6B, the rotation stopper may include a plurality of coupling grooves 23a formed in any one of the first and second inner housings 23 and 24 and a coupling protrusion 24b formed on the other of the first and second inner housings 23 and 24. For example, the first inner housing 23 may include the plurality of coupling grooves 23a formed along the longitudinal direction thereof, and the second inner housing 24 may include the coupling protrusion 24b formed along the longitudinal direction thereof so as to be inserted into the coupling groove 23a.

The coupling protrusion 24b may be formed to a predetermined length from the end of the second inner housing 24. Thus, when the second inner housing 24 is completely inserted into the first inner housing 23, the relative rotation between the first and second inner housings 23 and 24 may be stopped. When the end of the second inner housing 24 is separated from the end of the inner housing 23 by a distance larger than the length of the coupling protrusion 24b, the first and second inner housings 23 and 24 can be relatively rotated with respect to each other.

The plurality of coupling grooves 23a may be formed at intervals along the circumferential direction of the first inner housing 23. Desirably, the plurality of coupling grooves 23a may be formed at even intervals. Since the coupling grooves 23a are formed at intervals along the circumferential direction thereof, the second inner housing 24 may be rotated at a desired angle in a state where the first and second inner housings 23 and 24 are separated from each other, and then inserted into the first inner housing 23 so as to adjust the angles of the first and second inner housings 23 and 24.

The inner rubber 25 may be installed on the inner surface of the second inner housing 24. The inner rubber 25 may be formed of a buffer material such as rubber, like the outer rubber 22. The inner surface of the inner rubber 25 may be in direct contact with the stabilizer bar 11.

The retainer ring 26 may contract the second inner housing 24 toward the inside or the inner rubber 25. The retainer ring 26 may be formed in a ring shape of which one side is cut. Thus, the diameter of the retainer ring 26 may be varied in a predetermined range. When no external force is applied, the retainer ring 26 may pressurize the second inner housing 24 toward the inner rubber 25 because the retainer ring 26 has a slightly smaller inner diameter than the outer diameter of the second inner housing 24. The retainer ring 26 may be installed between the end of the first inner housing 23 and the flange portion 24a.

Hereafter, the process in which the stabilizer bar assembly 10 adjusts the angle of the stabilizer bar 11 will be described.

As illustrated in FIG. 4 or 5, the retainer ring 26 may be separated in order to adjust the angle of the stabilizer bar 11 (refer to FIG. 6A).

Then, as illustrated in FIG. 6B, the second inner housing 24 may be separated from the first inner housing 23. Since the first and second inner housings 23 and 24 cannot be relatively rotated with respect to each other in a state where the first and second inner housings 23 and 24 are assembled to each other, the second inner housing 24 may be slid and separated from the first inner housing 23 by a distance equal to or larger than the length of the coupling protrusion 24b.

Figure 6C:
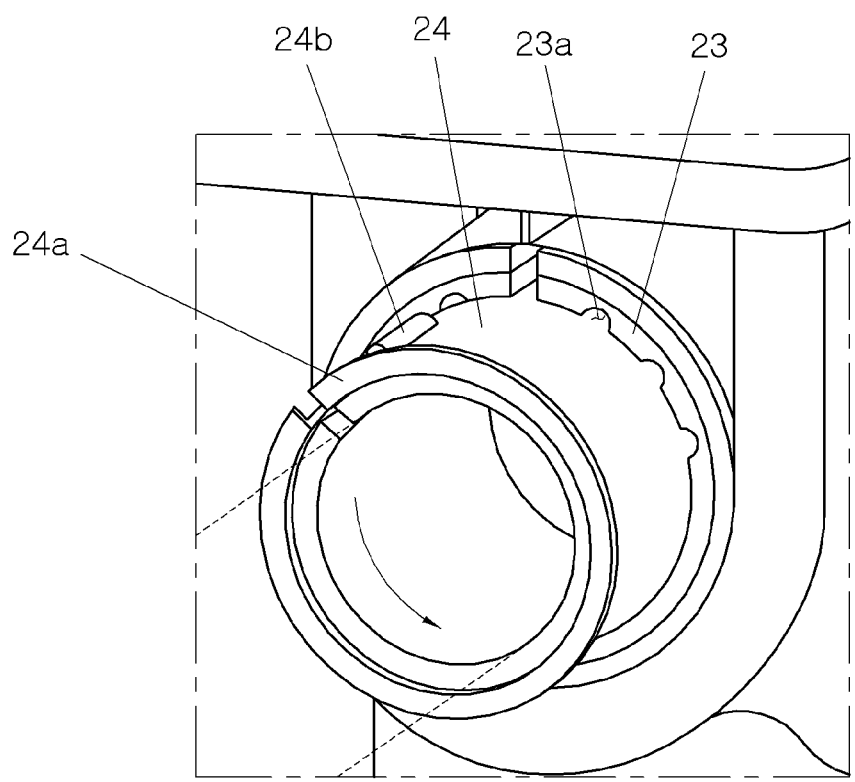

When the second inner housing 24 is separated from the first inner housing 23, the stabilizer bar 11 may be rotated at a desired angle (refer to FIG. 6C). At this time, since the second inner housing 24, the inner rubber 25 and the stabilizer bar 11 are assembled to each other, the second inner housing 24, the inner rubber 25 and the stabilizer bar 11 may be rotated together when the stabilizer bar 11 is rotated.

Figure 6D:
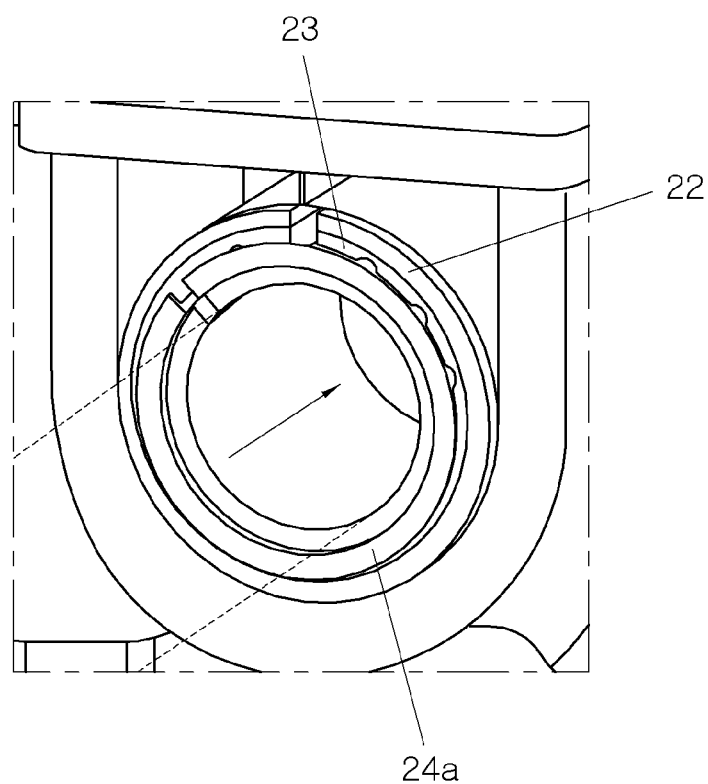
Figure 6E:
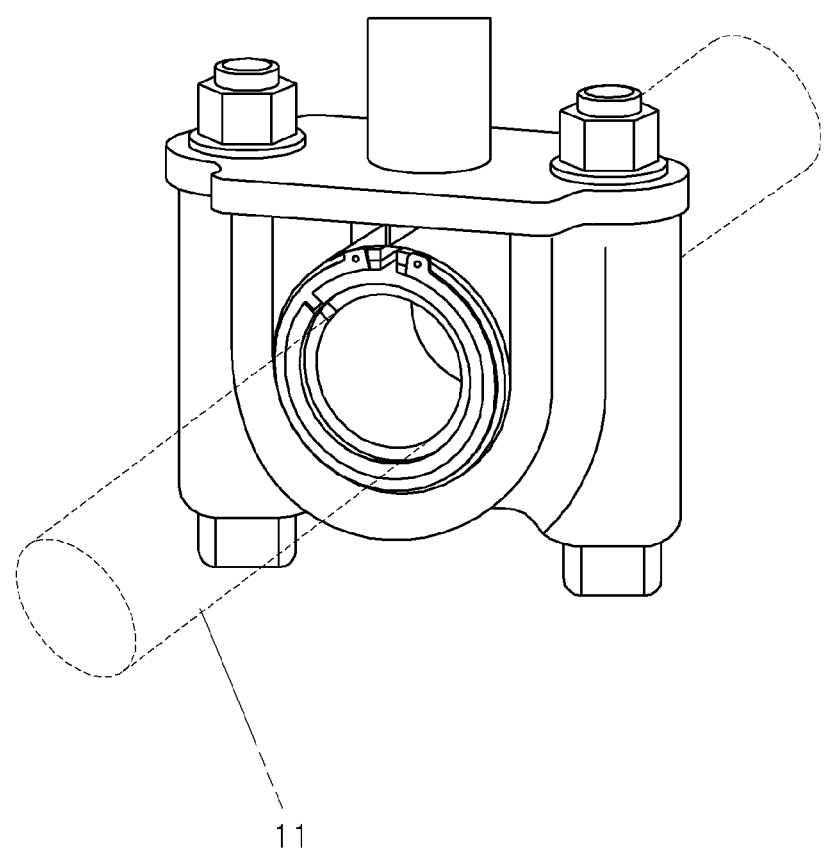

When the stabilizer bar 11 is completely rotated at the desired angle, the second inner housing 24 may be inserted into the first inner housing 23 as illustrated in FIG. 6D. When the second inner housing 24 is inserted into the first inner housing 23 such that the coupling protrusion 24b is inserted into a coupling groove 23a, the second inner housing 24, the inner rubber 25 and the stabilizer bar 11 cannot be rotated with respect to the first inner housing 23.

As such, when the angles of the second inner housing 24, the inner rubber 25 and the stabilizer bar 11 are completely adjusted, the retainer ring 26 may be disposed between the first and second housings 23 and 24, thereby maintaining the state in which the angles are completely adjusted.

In accordance with various embodiments of the present invention, since the first and second inner housings may be relatively rotated to adjust the angle of the stabilizer bar mounted in the bushing, the availability of the modularized stabilizer bar assembly may be increased.

That is, when the model or specification of the vehicle is changed or the installation angle of the stabilizer bar needs to be changed after the assembling process, the angle of the stabilizer bar may be easily adjusted.

Thus, the stabilizer bar assembly manufactured of the same parts may be applied in various manners, thereby increasing the productivity.

Furthermore, while the stabilizer bar assembly is set in a state optimized for operation after the stabilizer bar assembly is mounted on the vehicle, the deformation of the bushing may be prevented.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bushing having rotatable inner elements which includes a plurality of housings and a plurality of rubbers and into which a stabilizer bar is inserted to be mounted on a vehicle body, the bushing comprising:

an outer housing connected to a lower end of a rod connected to the vehicle body;

an outer rubber formed of a buffer material and attached on the inner surface of the outer housing;

a first inner housing disposed in the outer rubber;

a second inner housing disposed in the first inner housing to be rotated with respect to the first inner housing;

an inner rubber formed of a buffer material, disposed in the second inner housing, and being in contact with a surface of the stabilizer bar; and a retainer ring formed in a partially-cut ring shape such that the diameter thereof is increased, disposed between the first and second inner housings, and pressurizing the second inner housing toward the inner rubber.

2. The bushing of claim 1, wherein the second inner housing includes a flange portion formed at an end thereof, and the flange portion is extended in a radial direction of the second inner housing from the end of the second inner housing, and the retainer ring is disposed between the flange portion and an end of the first inner housing.

3. The bushing of claim 2, wherein when the retainer ring is spread and separated from the second inner housing, the first and second inner housings are relatively rotated with respect to each other.

4. The bushing of claim 1, further comprising a rotation stopper formed between the first and second inner housings to stop relative rotation between the first and second inner housings.

5. The bushing of claim 4, wherein the rotation stopper comprises:

a coupling groove formed in at least one of the first and second inner housings; and a coupling protrusion formed on a remaining one of the first and second inner housings.

6. The bushing of claim 5, wherein the coupling groove is formed in the first inner housing, and the coupling protrusion is formed on the second inner housing.

7. The bushing of claim 6, wherein the coupling protrusion is formed with a predetermined length from an end of the second inner housing to an inside of the second inner housing.

8. The bushing of claim 5, wherein a plurality of coupling grooves are formed at intervals along a circumference of at least one of the first and second inner housings.

9. The bushing of claim 8, wherein the coupling grooves are formed at even intervals.

10. A stabilizer bar assembly which comprises a bushing having rotatable inner elements, the stabilizer bar assembly comprising:

a pair of rods for coupling to a vehicle body through a bracket, with an interval provided therebetween;

the bushing having rotatable inner elements comprising:

an outer housing connected to lower ends of rods connected to the vehicle body;

an outer rubber formed of a buffer material and attached on the inner surface of the outer housing;

a first inner housing disposed in the outer rubber;

a second inner housing disposed in the first inner housing to be rotated with respect to the first inner housing;

an inner rubber formed of a buffer material, disposed in the second inner housing, and being in contact with a surface of the stabilizer bar; and a retainer ring formed in a partially-cut ring shape such that the diameter thereof is increased, disposed between the first and second inner housings, and pressurizing the second inner housing toward the inner rubber, wherein the bushing is coupled to each of lower ends of the rods; and a stabilizer bar formed in a widthwise direction of the vehicle body, having end portions which are bent in a longitudinal direction of the vehicle body such that both ends thereof are connected to the vehicle body, and inserted and fixed to the bushing.

* * * * *